(12) United States Patent
Adams et al.

(10) Patent No.: US 10,572,690 B2
(45) Date of Patent: Feb. 25, 2020

(54) METHOD AND DEVICE HAVING SECURE REMOVABLE MODULES

(71) Applicant: BlackBerry Limited, Waterloo (CA)

(72) Inventors: Neil Patrick Adams, Waterloo (CA); Steven Wellington, Waterloo (CA)

(73) Assignee: BlackBerry Limited, Waterloo (CA)

( * ) Notice: Subject to any disclaimer, the term of this patent is extended or adjusted under 35 U.S.C. 154(b) by 94 days.

(21) Appl. No.: 15/256,241

(22) Filed: Sep. 2, 2016

(65) Prior Publication Data

US 2018/0068133 A1    Mar. 8, 2018

(51) Int. Cl.
| | | |
|---|---|---|
| G06F 21/73 | (2013.01) | |
| G06F 21/44 | (2013.01) | |
| G06F 21/86 | (2013.01) | |
| G06F 21/85 | (2013.01) | |

(52) U.S. Cl.
CPC ............ *G06F 21/73* (2013.01); *G06F 21/44* (2013.01); *G06F 21/85* (2013.01); *G06F 21/86* (2013.01)

(58) Field of Classification Search
CPC .......... G06F 21/73; G06F 21/86; G06F 21/85; G06F 21/44
See application file for complete search history.

(56) References Cited

U.S. PATENT DOCUMENTS

| | | | |
|---|---|---|---|
| 6,111,505 A | 8/2000 | Wagener | |
| 6,170,026 B1 * | 1/2001 | Kimura | G06F 1/1632 709/221 |
| 7,330,216 B2 | 2/2008 | Purdy et al. | |
| 7,456,822 B2 | 11/2008 | Bumiller et al. | |
| 7,656,398 B2 | 1/2010 | Buckley et al. | |
| 7,706,837 B2 | 4/2010 | Ladouceur et al. | |
| 7,933,611 B2 | 4/2011 | Bocking et al. | |
| 7,953,436 B2 | 5/2011 | Ladouceur et al. | |
| 8,265,797 B2 * | 9/2012 | Nickerson | A01G 25/16 239/69 |
| 8,494,591 B2 | 7/2013 | Bocking et al. | |

(Continued)

FOREIGN PATENT DOCUMENTS

WO    03/053026 A2    6/2003

OTHER PUBLICATIONS

Tobias Isakeit: "Fairphone 2 Teardown", www.ifixit.com, XP055424459, Nov. 18, 2015, retrieved from URL: https://de.ifixit.com/Teardown/Fairphone+2+Teardown/52523.

(Continued)

*Primary Examiner* — Chau Le
(74) *Attorney, Agent, or Firm* — Moffat & Co

(57) ABSTRACT

A method at an electronic device having at least one slot to receive a removable security module, the method including detecting coupling of the security module to the electronic device; sending a challenge to the security module; receiving a response from the security module; checking whether the response is valid at the electronic device; and providing a signal based on results of the checking, wherein only a defined number of security modules are configured to provide a valid response per slot or for each security module type at the electronic device. Further, a method for preventing functionality on an electronic device, the method including replacing a valid security module coupled to the electronic device with a dummy security module; detecting uncoupling of the dummy security module; and providing an alert.

11 Claims, 7 Drawing Sheets

(56) References Cited

U.S. PATENT DOCUMENTS

| | | | |
|---|---|---|---|
| 8,725,206 B2 | 5/2014 | Ladouceur et al. | |
| 9,154,913 B2 | 10/2015 | Bocking et al. | |
| 9,871,663 B2* | 1/2018 | Pearson | H04L 9/3234 |
| 9,917,687 B2* | 3/2018 | Wooten | G06F 8/65 |
| 2004/0124966 A1* | 7/2004 | Forrest | G06Q 20/32 |
| | | | 340/5.8 |
| 2005/0107046 A1* | 5/2005 | Desbarats | E05C 19/022 |
| | | | 455/90.3 |
| 2006/0149966 A1* | 7/2006 | Buskey | H04L 9/3271 |
| | | | 713/168 |
| 2007/0278992 A1* | 12/2007 | Paul | H01M 2/34 |
| | | | 320/107 |
| 2010/0093375 A1 | 4/2010 | Buckley et al. | |
| 2011/0128378 A1* | 6/2011 | Raji | G06F 17/30873 |
| | | | 348/143 |
| 2011/0297745 A1* | 12/2011 | Isuyama | G11B 5/00808 |
| | | | 235/449 |
| 2012/0233681 A1* | 9/2012 | Adams | G06F 1/1626 |
| | | | 726/7 |
| 2013/0176104 A1* | 7/2013 | Rich | H04W 12/06 |
| | | | 340/5.8 |
| 2015/0170145 A1* | 6/2015 | Patel | G06F 8/20 |
| | | | 705/44 |
| 2015/0261950 A1* | 9/2015 | Schulz | G06F 21/51 |
| | | | 726/22 |
| 2016/0042188 A1* | 2/2016 | Nasserbakht | G06F 21/606 |
| | | | 726/3 |
| 2016/0056902 A1* | 2/2016 | Eremenko | H04M 1/24 |
| | | | 455/67.11 |
| 2016/0072643 A1* | 3/2016 | Fisher | H04L 41/0809 |
| | | | 370/328 |
| 2016/0148196 A1* | 5/2016 | Dides | G06Q 20/405 |
| | | | 705/41 |
| 2017/0041442 A1* | 2/2017 | Connell | H04N 5/2257 |
| 2017/0052919 A1* | 2/2017 | Purcell | G06F 13/4022 |
| 2017/0085686 A1* | 3/2017 | Gilchrist | H04M 1/0254 |
| 2017/0171371 A1* | 6/2017 | Jannard | H04M 1/0264 |
| 2017/0179661 A1* | 6/2017 | Szeto | H04M 1/72527 |
| 2017/0180984 A1* | 6/2017 | Thomas | H04W 12/02 |
| 2017/0199671 A1* | 7/2017 | Tormasov | G06F 11/1451 |
| 2017/0242805 A1* | 8/2017 | Nietner | G06F 1/163 |

OTHER PUBLICATIONS

European Patent Office, Partial European Search Report for Application 17188208.7-1870, dated Nov. 22, 2017.

European Patent Office, Extended European Search Report for Application No. 17188208.7-1218, dated Feb. 8, 2018.

* cited by examiner

METHOD AND DEVICE HAVING SECURE REMOVABLE MODULES

FIELD OF THE DISCLOSURE

The present disclosure relates to electronic devices and in particular relates to electronic devices having removable modules.

BACKGROUND

Policies for some facilities or buildings do not allow electronic devices to be brought into the facilities or buildings. Such policies may be due to security or privacy concerns. For example, to ensure information security, locations such as government buildings or research facilities may not allow devices that have cameras or microphones. Locations such as locker rooms or change rooms may not allow devices having cameras on them for privacy reasons. Other locations may not allow devices having communications capabilities or a subset of communication capabilities within them. Other examples are possible.

Currently, such locations or facilities typically require a user to enter the facility without the electronic device. This can mean either informing the user to leave the device behind when coming to the facility, or checking in the device at a security desk or other location within the facility prior to entering the facility.

In some cases, the use of the electronic device, even without the functionality that the facility is worried about, could be useful to a user. For example, if the user had a mobile device, the device could be used for emails, taking notes, document referral, among other options even without the use of a microphone or camera on the device.

BRIEF DESCRIPTION OF THE DRAWINGS

The present disclosure will be better understood with reference to the drawings in which.

DETAILED DESCRIPTION

Figure 1A:
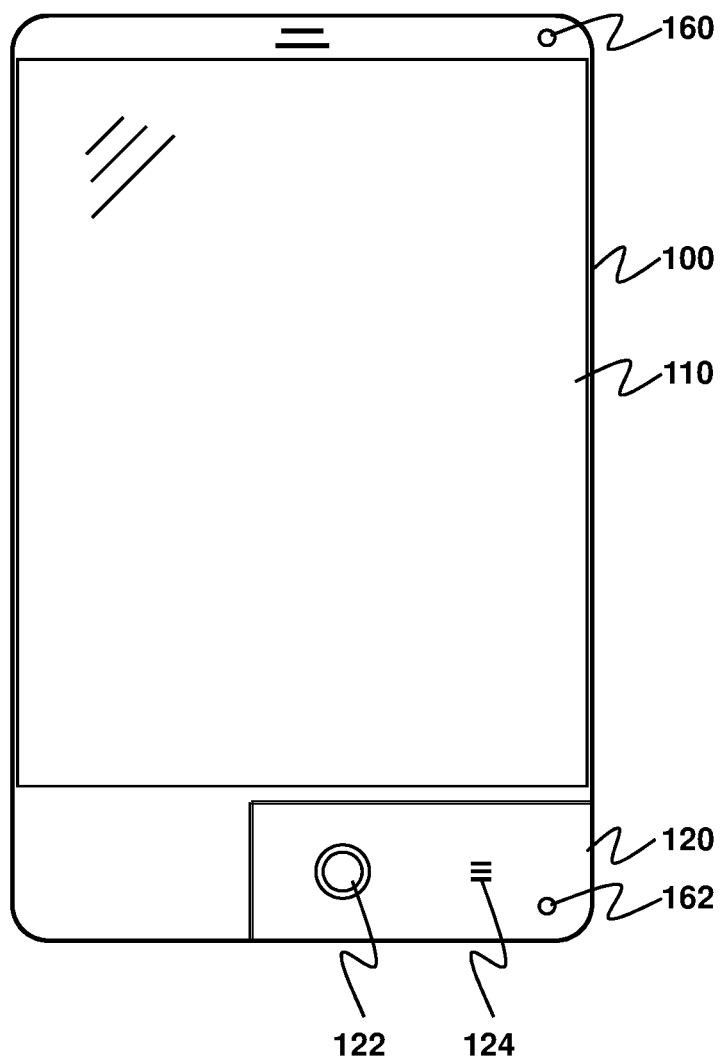
FIG. 1A is front plan view of an example electronic device having one removable security module.

The present disclosure provides a method at an electronic device configured to couple to a removable security module, the method comprising: detecting coupling of the security module to the electronic device; sending a challenge to the security module; receiving a response from the security module; checking whether the response is valid at the electronic device; and providing a signal based on results of the checking, wherein only a defined number of security modules are configured to provide a valid response per slot or for each security module type at the electronic device.

The present disclosure further provides an electronic device comprising: a processor; and at least mechanism to couple the electronic device to a removable security module wherein the electronic device is configured to: detect coupling of the security module with the electronic device; send a challenge to the security module; receive a response from the security module; check whether the response is valid at the electronic device; and provide a signal based on results of the checking, only a defined number of security modules are configured to provide a valid response per slot or for each security module type at the electronic device.

The present disclosure further provides a computer readable medium for storing instructions which, when executed by a processor of an electronic device having at least one slot to receive a removable security module, cause the electronic device to: detect coupling of the security module with the electronic device; send a challenge to the security module; receive a response from the security module; check whether the response is valid at the electronic device; and provide a signal based on results of the checking, only a defined number of security modules are configured to provide a valid response per slot or for each security module type at the electronic device.

The present disclosure further provides a method for preventing functionality on an electronic device, the method comprising: replacing a valid security module coupled to the electronic device with a dummy security module; detecting uncoupling of the dummy security module; and providing an alert.

The present disclosure further provides a system for preventing functionality on an electronic device, the system comprising: the electronic device; and a dummy security module to replace a valid security module coupled to the electronic device; wherein at least one of the electronic device or the security module is configured to: detect uncoupling of the dummy security module; and provide an alert.

The present disclosure relates to electronic devices such as mobile devices, smart phones, tablets, computers, vehicle electronics, devices comprising a camera or microphone or both, among other options. In accordance with the embodiments described herein, the design of the electronic device is modular, meaning that at least one component of the device can be removed. This may allow components to be upgraded over time without upgrading the entire electronic device, thereby reducing costs and saving electronic waste.

In the embodiments described below, the electronic device is a mobile device. However, this is merely provided as an example and other electronic devices could equally be used. The present disclosure is therefore not limited to mobile devices.

Reference is now made to FIG. 1A which shows a first example mobile device 100. Device 100 includes a display 110 which, in some embodiments, may be a touch screen to allow user interaction with device 100.

In the example of FIG. 1A, a security module 120 is a removable module which fits into a slot on device 100. Security module 120 includes a forward facing camera 122 and a microphone 124. In some embodiments, security module 120 may further include a rear facing camera (not shown). As used herein, the term security module is used to indicate a removable module having at least one functional element, where the module may be securely paired with the device.

In some cases, security module 120 may communicate with device 100 through wired or wireless communications in which a physical slot is not necessary. Therefore, any coupling of the security module to the device where communications are enabled are within the scope of the present disclosure.

Figure 1B:
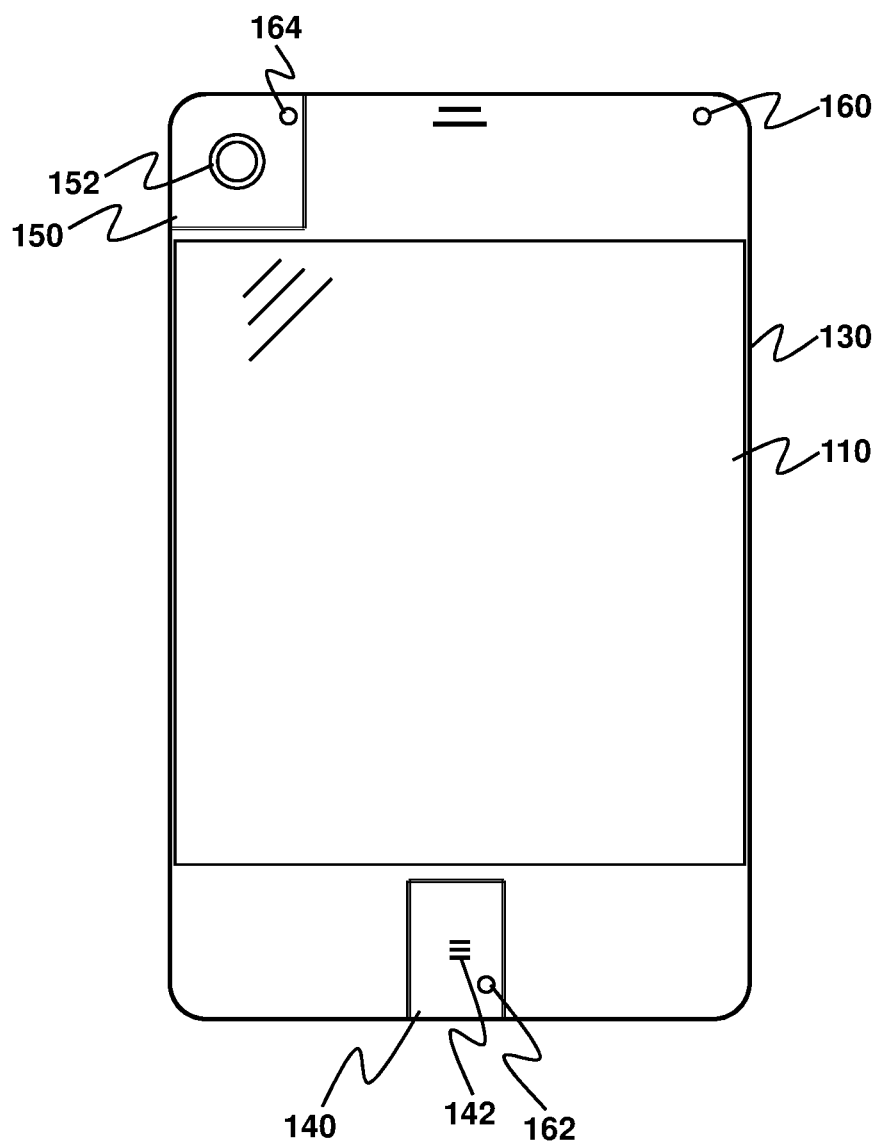
FIG. 1B is front plan view of an example electronic device having two removable security modules.

Referring to FIG. 1B, a second example mobile device 130 is provided. Device 130 includes a display 110. However, in the example of FIG. 1B, two removable security modules are provided. Specifically, security module 140 includes a microphone 142. Security module 150 includes a camera 152.

The embodiments of FIGS. 1A and 1B are merely examples. In other embodiments, a plurality of security modules could be included on the device. For example, the device may be completely modular and each component of the device may be removable. Thus, in some embodiments, the radio chipset for the device may be included in a module which may be removable and replaceable with a different radio chipset. In other embodiments, a Wi-Fi chipset may be replaceable, a specific cellular chipset near be replaceable, the display may be replaceable, among other options. Modules may have one or a plurality of functional elements, including but not limited to microphones, cameras, communications chipsets, etc. The present disclosure is not limited to any particular design of a modular electronic device.

In other cases, an electronic device may have modules that a manufacturer or owner of the device does not want replaced unless the replacement is a verifiable component. For example, in a car, consider a sensor module implementing some or all of a vision system that provides input for driver-assist or autonomous driving systems. If that module is replaced with a module different than the original (for example an aftermarket brand), it may have safety implications. Ensuring each module is of a type that has been vetted for safe operation with the controller system would protect from unproven configurations stemming from repairs. Similarly, detecting that a module was substituted with another module of the same type may be necessary to ensure the substituted module is safely tuned or calibrated for the vehicle where it will operate. For complex, safety critical systems, a secure challenge/response as described below offers a means to constrain repair work to authorized and trained people and/or facilities.

Similarly, utility companies may have meters/sensors for electricity/gas/water. Control for these functions may be consolidated to share a controller for monitoring, but the utilities may want to be able to securely control which sensors it is connected to.

Other examples of modules in an electronic device are possible.

Utilizing devices having security modules 120, 140 or 150 from FIGS. 1A and 1B above, the devices may, in certain circumstances, be allowed into a facility if the security modules 120, 140 or 150 were removed. For example, a building or facility may not allow a camera, but if a camera module is removed and left with a security desk then the remaining device may be allowed into the facility.

One issue with the removal of a security module, however, is that such solution does not prevent a user from putting another security module into the device once beyond a security checkpoint. The security modules could be relatively small, and may be hidden among the user's belongings when entering the facility.

In this regard, in accordance with one embodiment of the present disclosure, a security module may be securely paired with the electronic device. Thus, the security module and device may communicate with each other and the security module may be authenticated to the electronic device. For example, the electronic device may perform a challenge response authentication to validate the module inserted into a slot on the device, or may perform a challenge response once communications between the device and security module become possible (for example by the security module coming into close proximity to the device).

In accordance with one embodiment of the disclosure, only a single module for each module slot may be paired with the device. The device may perform the challenge response authentication once a module is inserted or coupled, and if the module passes the challenge then a signaling mechanism on the device or module may be used to signal that the module is currently paired to the device. In other embodiments, only a defined number of security modules per slot may be paired with the device. For example, a main module and a spare. Such defined number would typically be known to the facility which the device is entering, or the device itself may be queried to determine the number of paired modules, for example.

In another embodiment, only a single security module (or only a defined number of security modules) having certain functionality may be paired with the device at one time. For example, only one security module having camera functionality may be paired with the device at one time.

Various options for signaling exist. For example, a signaling mechanism may include a light emitting diode (LED) 160 on the device, which may turn green on the successful pairing of the module with the device, and may turn red otherwise.

In addition, or instead of LED 160, an LED 162 or 164 on the module itself may be used for signaling. LED 162 or 164 may turn green once the successful authentication of the module with the device has occurred.

In still further embodiments, the signaling mechanism may be an audible signaling mechanism, for example a ping or verbal confirmation of the pairing.

In still further embodiments, the successful pairing may result in text or graphics being displayed on display 110.

Other options are possible and the present disclosure is not limited to any particular signaling mechanism.

Thus, as described below, when a user inserts the security module into the electronic device or otherwise couples the security module to the device, if the module is the one paired with the electronic device then the signaling mechanism signals a successful pairing. The LED may turn green if the module is paired to the electronic device and red if not paired.

Therefore, when a user gets to the secure facility, he or she may show the security guard that the LED is green, indicating a matching module. The user may then disconnect the module and provide it to the security guard while keeping the remaining parts of device 100 or 130.

Since only a single pairing at the time may occur, any other module that is inserted or coupled when the device is in the building will fail to authenticate or match. Hardware, software or firmware on the device may prevent any functionality in a non-paired module, ensuring a substitute camera, microphone or other functional element will not work.

In one embodiment the pairing of the security module may be done at manufacturing time.

When multiple security modules exist on the device, the LED 160 may only turn green in cases where all of the modules are paired to the device. Thus, for example, if on a device having multiple security modules such as the embodiment of FIG. 1B, if any one of the modules is not a paired module, then LED 160 may turn red.

Figure 2:
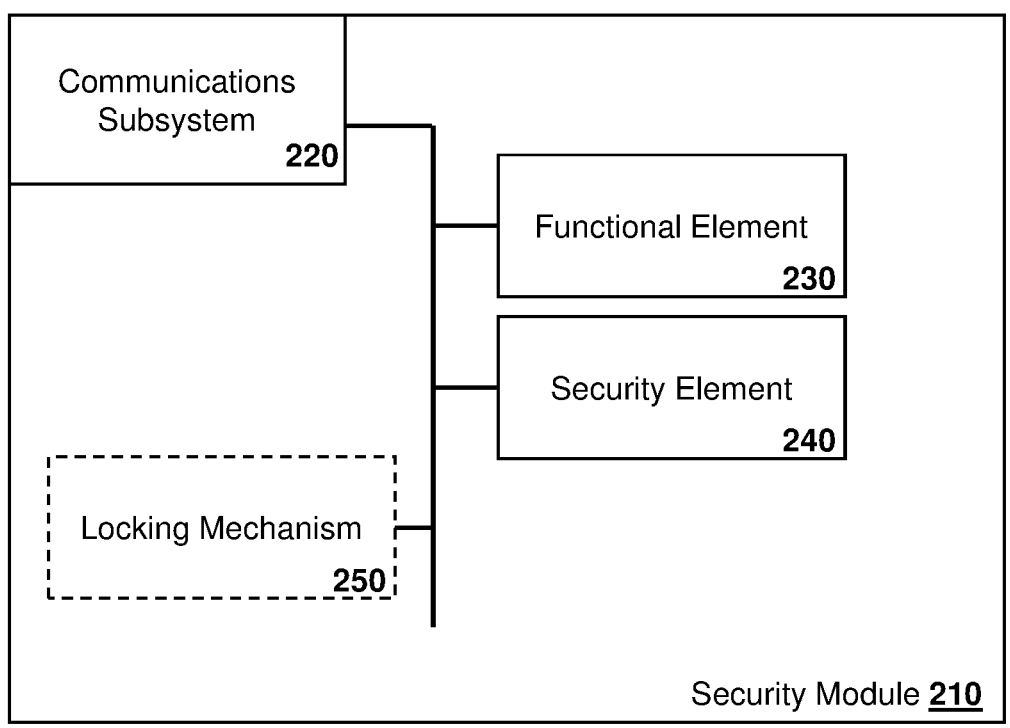
FIG. 2 is a block diagram of an example security module.

One example security module is shown with regard to FIG. 2. The embodiment of FIG. 2 is a simplified block diagram showing the functional elements of security module 210.

In particular, a communications subsystem 220 is provided to allow the security module 210 to communicate with an electronic device such as mobile device 100 of FIG. 1A. For example, communication subsystem 220 may be a physical connector corresponding to a connector within the module slot on mobile device 100. Such communication subsystem 220 may provide for both communication and power to security module 210 in some embodiments.

In other embodiments, communication module 220 may be a wireless communication module. For example, communication module 220 may allow for near field communications (NFC) with mobile device 100.

A functional element 230 on the security module 210 could include numerous functionality for the security module. For example, if the security module is for a camera then the functional element 230 may be the camera and the electronics associated therewith. Similarly, if the security module is for a microphone then the functional element 230 may include the microphone and components associated with the microphone.

In other embodiments, functional element may have multiple functions. For example, if security module 210 corresponds to security module 120 from FIG. 1A, then functional element 230 may include both the camera and microphone.

In other embodiments, functional element 230 may include a chipset for a cellular communication network, a chipset for Wi-Fi, a chipset for all radio communications, among other options.

In other embodiments, functional element 230 may include a speaker to allow audible signaling, such as when the module is successfully paired to the electronic device. The speaker may further be used for an audible alarm, as provided below.

In the embodiment of FIG. 2, security module 210 further includes a security element 240. For example, security element 240 may be a secure storage in which the codes for the security module are stored. Thereafter, if device 100 issues a challenge to security module 210, the challenge may be propagated to security element 240, which may then provide a response back to mobile device 100. Mobile device 100 may thereafter verify that the response is the expected response. Security element 240 may include secure storage for logs in some cases.

In some embodiments other components could exist within security module 210. For example, security module 210 may include a battery or other power unit to power functional elements 230.

In other embodiments, a locking mechanism 250 may be provided which locks module 210 onto a device 100, thereby preventing removal of the security module unless preconditions are met.

Figure 3:
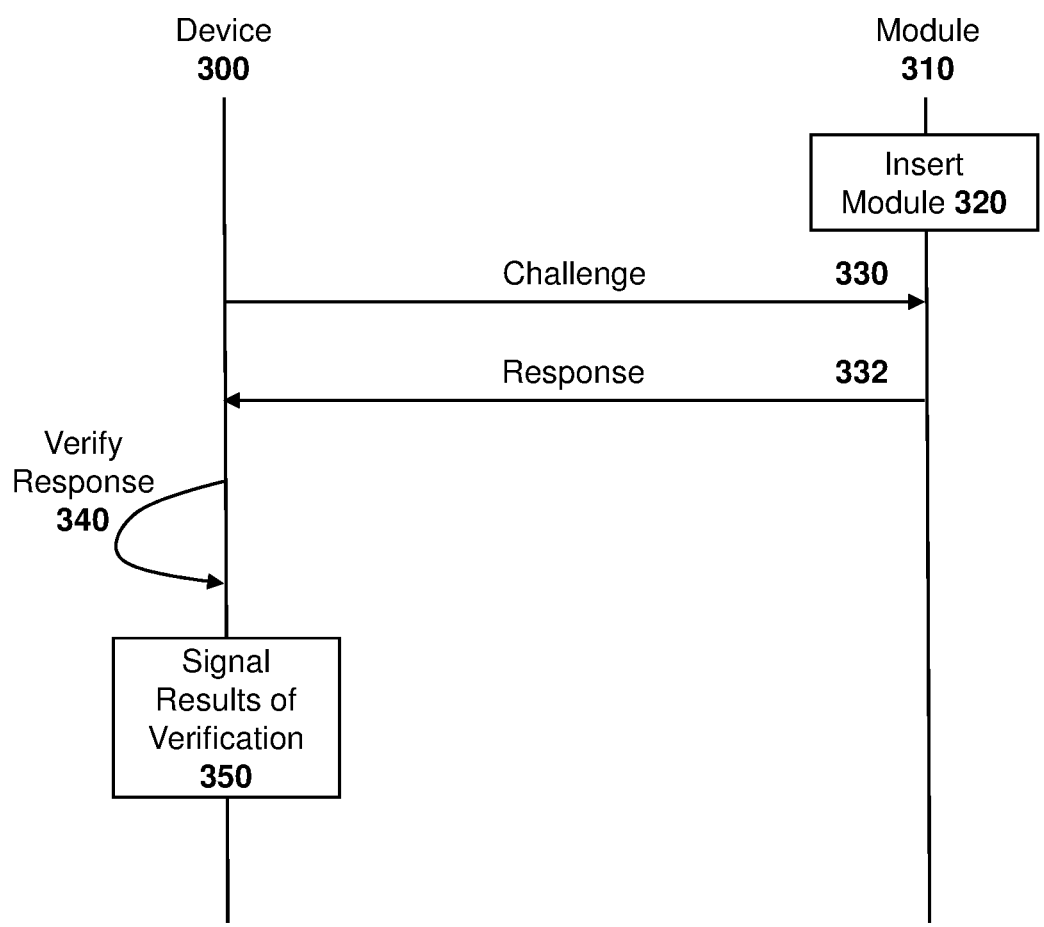
FIG. 3 is a data flow diagram showing the verification and signaling upon insertion of the security module into a slot on the electronic device.

Reference is now made to FIG. 3, which shows an example dataflow diagram for the verification of the pairing of a module 310 to a device 300.

At block 320 the module 310 is inserted into device 300. This may allow wired or wireless communications between module 310 and device 300. Further, the insertion may be virtual and may merely indicate any coupling in which communications are now possible between the module 310 and device 300.

Thereafter, device 300 sends a challenge 330 to module 310. In one embodiment, challenge 330 may be a random challenge to avoid a replay attack. Module 310 may use a secure element within the module to generate a response, which is then provided back to device 300 as shown by message 332.

Device 300 may verify the response, as shown by arrow 340. Thereafter, the device 300 may signal the results of the verification in block 350. As provided above, the signaling at block 350 may, for example, turn an LED light on the device or the module green if the verification is successful or red if the verification is unsuccessful. In other embodiments the signaling at block 350 may create distinct audible signals depending on whether the verification was successful or not. In other embodiments the signaling may provide a message on display 110 from FIGS. 1A and 1B, which may indicate success or not. Other signaling options are possible.

Device 300 will only accept the functionality of module 310 if the verification of the response at block 340 is successful. Therefore, if the user, after surrendering the paired module at the security desk of the facility, attempts to couple an alternate module, the verification response at block 340 will be negative and therefore the device 300 will block the functionality of module 310.

In one embodiment, in order to ensure security is not breached, the paired module may need to be inserted or coupled prior to the user leaving the facility, to ensure that the LED 160 still turns green. For example, to prevent a user from somehow pairing another module, a security check may include returning the module that was stored at the security desk to a user and requesting the user to couple the module to the device to ensure the LED 160 turns green.

In an alternative embodiment, a security module may be replaced with a dummy security module by a security guard at the secure facility. The dummy security module does not provide any of the functionality of the original module. Instead, it tries to prevent a user from removing it to be replaced by a functional security module. This can be accomplished in several ways.

In a first embodiment, the dummy security module may beep very loudly on removal or uncoupling. For example, the security module may have an alarm that continues to go off until turned off by a security guard. In this case, module 210 may use a speaker in functional element 230 to provide such alarm.

Alternatively, the dummy security module removal or uncoupling may be detected by the device, and the device may be configured to provide the alarm when certain preconditions have not been met. For example, the device may enter a security mode through NFC communications between the device and a transceiver at the security desk. When in the security mode, the device may cause an alarm to sound if the dummy security module is removed. The dummy security module may be legitimately removed only on authorization of removal at the security desk (for example through another NFC communication between the device and a NFC transmitter at the security desk).

In a further embodiment, the module may log any removal or uncoupling from the device, which may then be detected by the security guard on the user leaving the facility. In this case, module 210 may use security element 240 to store logs.

In a further embodiment, the module may have a radio function to transmit removal and current location. Thus, in this case, communication module 220 may include radio function that will alert the facility when the module is removed or uncoupled.

In one embodiment, in order to facilitate the deployment to users from the security officer, devices may have mechanism to quickly assign a dummy security module to a device as well as to confirm the correct use of the device while in the facility. For example, such functionality may be provided through a NFC reader, which pairs the device to the dummy security module.

In other embodiments, the pairing of the dummy module may cause locking mechanism 250 to lock the security module to the device and only the use of the same NFC transmitter may allow the disconnection of the dummy security module from the device.

With reference to the security module of FIG. 2, functional element 230 in a dummy security module may not exist, or does not provide the functionality of the original security module.

Figure 4:
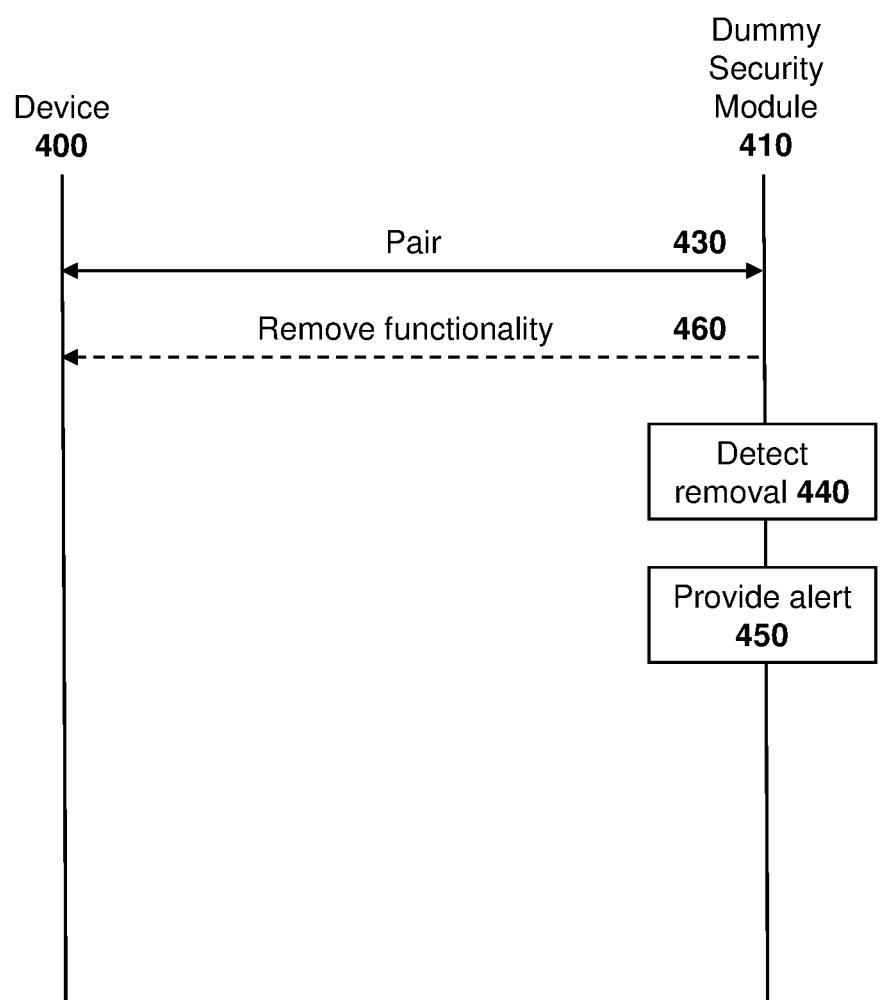
FIG. 4 is a data flow diagram showing the provision of an alert upon removal of a dummy security module from an electronic device.

Reference is now made to FIG. 4, which shows a dataflow diagram between a device 400 and a dummy security module 410.

In the embodiment of FIG. 4, the module and device are first paired, as shown with arrow 430. For example, this may be done through NFC or through other communications between the device and dummy module. Alternatively, the pairing may involve a third device, such as a computer and NFC terminal at a security desk.

Thereafter, if dummy security module 410 detects removal or uncoupling from the device, as shown by block 440 then dummy security module 410 provides an alert as shown by block 450. Alert 450 may be, for example, an audible alarm, a radio communication to the facility, a log alert stored within a secure element of dummy security module 410, among other options.

In a further embodiment, the coupling of the dummy security module to device may cause the device to strip functionality of other modules or other functionality of the device itself, as shown by arrow 460. For example, if the dummy security module is coupled to the device, then software or firmware within the device may restrict functionality of the device. For example, a device may turn off all cameras including forward and rear facing cameras whenever a security module or dummy security module is coupled to the device.

In an alternative embodiment, the dummy security module may communicate to the device which functionality should be disabled. Thus, for example, the dummy security module may provide device 400 with a list of functionality that should be disabled on device 400 within the message of arrow 460. Device 400 then would disable the functionality provided in such list until dummy security module 410 is removed.

In some cases, the embodiments above may be combined. For example, the embodiment in which only single module may be paired with an electronic device may be combined with the embodiments in which a dummy module is coupled to the device on entering a facility. In this case a security guard may both see that the signal (for example the green LED) shows that the module is paired on entering the facility. The guard may then store the paired module and further couple a dummy module to the device while the device is in the facility.

In other cases, the embodiments with the dummy security module can be used independently from embodiments in which only one paired module at a time is allowed.

In cases where only one paired module is allowed, in some situations a user may want to upgrade a module. For example, a new module may contain a better camera. In order to allow upgrades to a module without compromising security, if the device is to allow upgrades to the security module then the old security module may be needed. Thus, for example, an upgrade process may be the insertion of the new module and interaction with the device to upgrade the module. The device may then require insertion of the old module within a time limit to confirm the upgrade. This would preclude the ability of a user who has left a paired module at a security desk from being able to bypass security by upgrading the module.

If the paired security module is lost or damaged, the device may, in one case, need to be sent back to the manufacturer for replacement in order to prevent security gaps. In other embodiments, the authorization may be delayed for a significant time period. For example, the authorization may be delayed for 24 hours in one case.

In other embodiments, authorization of a new security module may require remote authorization, for example by a manufacturer or approved agent. This remote authorization may need the device to be in a neutral location, such as a home or billing address, a hotel or other public location, among other options. Alternatively, authorization may be needed from both the device manufacturer or approved agent, as well as from an authority at the facility in which the device is located.

Other options are possible.

The electronic device described above may be any device with a removable security module. One simplified diagram of an electronic device is shown with regard to FIG. 5.

Figure 5:
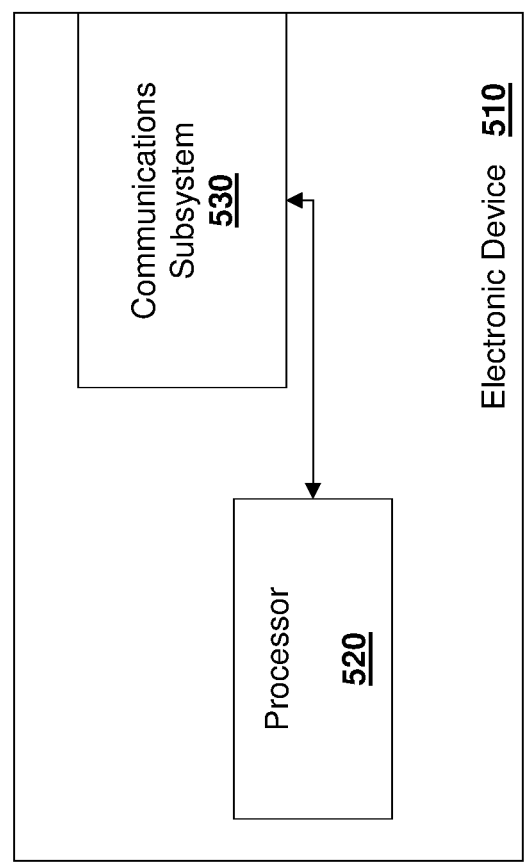
FIG. 5 is a block diagram of a simplified electronic device capable of being used with the methods and systems herein according to one embodiment.

In FIG. 5, electronic device 510 includes a processor 520 and a communications subsystem 530, where the processor 520 and communications subsystem 530 cooperate to perform the methods described above. Specifically, the processor 520 and communications subsystem 530 may be used to communicate with a security module such as that of FIG. 2. In some cases, the processor and communications subsystem may be integrated in a single chip.

Communications subsystem 530 may provide for wired or wireless communication.

Further, if the electronic device is a mobile device, one exemplary device is described below with regard to FIG. 6.

Mobile device 600 is typically a two-way wireless communication device having voice and/or data communication capabilities. Mobile device 600 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a vehicle, or a data communication device, as examples.

Where mobile device 600 is enabled for two-way communication, it may incorporate a communication subsystem 611, including a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some networks network access is associated with a subscriber or user of mobile device 600. A mobile device may require a removable user identity module (RUIM) or a subscriber identity module (SIM) card in order to operate on a network. The SIM/RUIM interface 644 is normally similar to a card-slot into which a SIM/RUIM card can be inserted and ejected. The SIM/RUIM card can have memory and hold many key configurations 651, and other information 653 such as identification, and subscriber related information. Without a SIM card, the mobile device may still be capable of limited functionality, including placing an emergency call.

When required network registration or activation procedures have been completed, mobile device 600 may send and receive communication signals over the network 619. As illustrated in FIG. 6, network 619 can include multiple base stations communicating with the mobile device.

Signals received by antenna 616 through communication network 619 are input to receiver 612, which may perform such common receiver functions as signal amplification, frequency down conversion, filtering, channel selection and the like. Analog to digital (A/D) conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog (D/A) conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Figure 6:
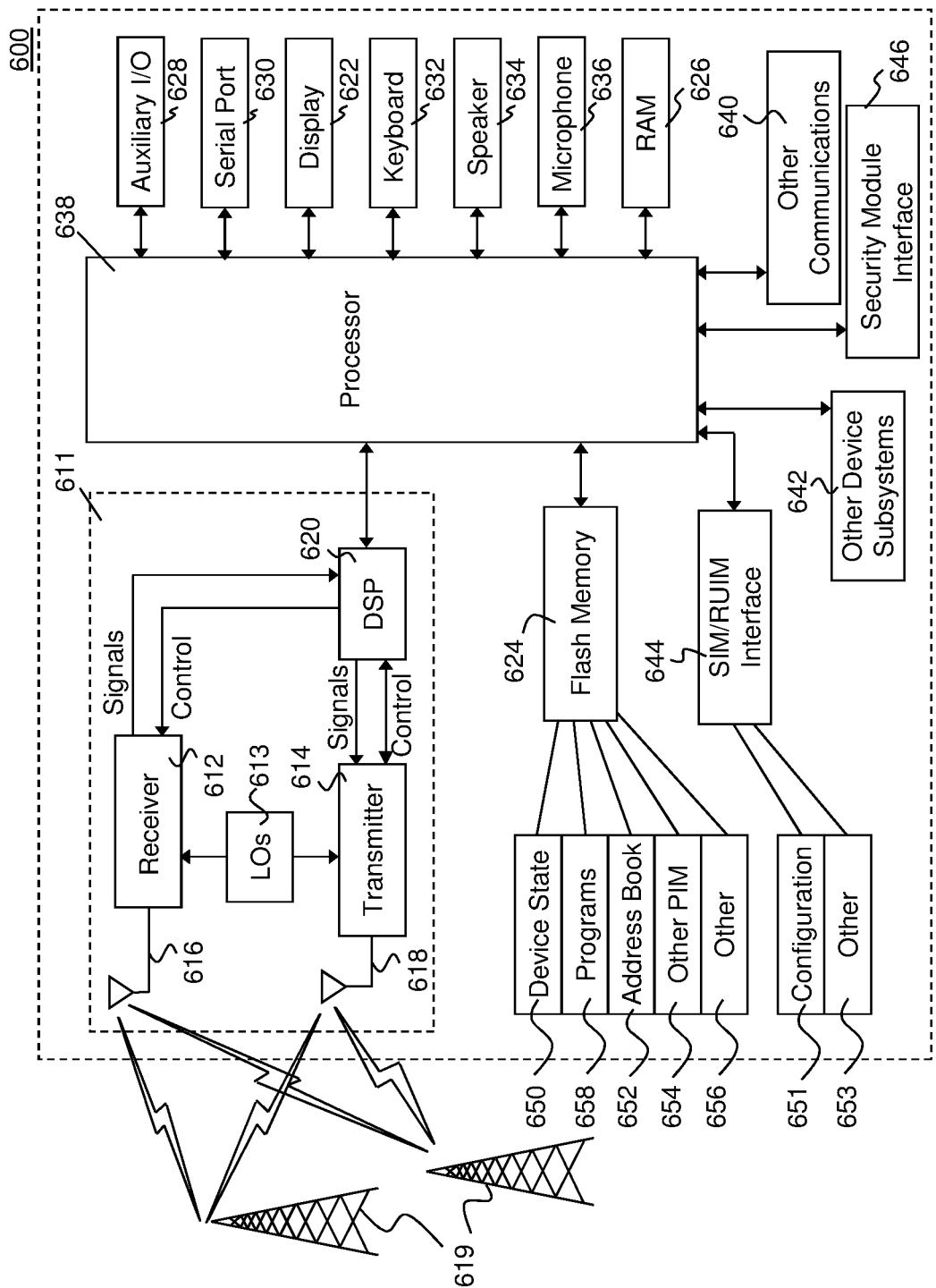
FIG. 6 is a block diagram of a mobile device according to one embodiment.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Further applications, including productivity applications, social media applications, games, among others, may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals may typically be output to a speaker 634 and signals for transmission may be generated by a microphone 636. Alternative voice or audio I/O subsystems, such as a voice message recording subsystem, may also be implemented on mobile device 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6 may be implemented in a mobile device for which synchronization with a user's desktop computer (not shown) may be desirable, but is an optional device component. Such a port 630 may enable a user to set preferences through an external device or software application and may extend the capabilities of mobile device 600 by providing for information or software downloads to mobile device 600 other than through a wireless communication network. As will be appreciated by those skilled in the art, serial port 630 can further be used to connect the mobile device to a computer to act as a modem or for charging a battery on the mobile device.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may further include non-cellular communications such as WiFi or WiMAX, or near field communications.

A security module may interact with processor 638 through a security module interface 646 and provide functionality as described above.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at an electronic device configured to couple to a first security module, the method comprising:
    pairing the first security module with the electronic device;
    detecting coupling of the first security module to the electronic device;
    sending a challenge to the first security module;
    receiving a response from the first security module;
    checking whether the response is valid at the electronic device, wherein a valid response indicates that the first security module was previously paired with the electronic device; and
    providing a signal based on a result of the checking,
    wherein only a defined number of security modules are allowed to be paired with the electronic device per slot or for each security module type at the electronic device, the defined number being stored at the electronic device;
    wherein each security module is associated with a functionality;
    wherein the electronic device comprises a display; and
    wherein the method further comprises preventing the pairing based on incompatible functionalities rules.

2. The method of claim 1, wherein the signal comprises a visual signal providing a first indication if the checking finds the response is valid and a second indication if the checking finds the response is invalid.

3. The method of claim 1, wherein the signal comprises at least one of an audible signal; an output to a display on the electronic device; or a light emitting diode on the electronic device.

4. The method of claim 1, further comprising disabling functionality of the first security module if the response is invalid.

5. The method of claim 1, further comprising preventing a second security module from becoming paired with the electronic device unless the first security module currently configured to provide the valid response is first inserted.

6. The method of claim 5, wherein the second security module, upon pairing, becomes an upgraded security module configured to provide the valid response.

7. The method of claim 1, wherein the first security module provides at least one of a camera function, a microphone function, a cellular radio function, a WiFi radio function, or a display function.

8. The method of claim 1, wherein the coupling of the first security module to the device comprises inserting the security module into a slot of the device.

9. The method of claim 1, further comprising:
    replacing the first security module coupled to the electronic device with a dummy security module;
    detecting uncoupling of the dummy security module; and
    providing an alert.

10. An electronic device comprising:
    a processor; and
    at least one mechanism to couple the electronic device to a first security module,
    wherein the electronic device is configured to:
        pair the first security module with the electronic device;
        detect coupling of the security module with the electronic device;
        send a challenge to the security module;
        receive a response from the security module;
        check whether the response is valid at the electronic device, wherein a valid response indicates that the security module was previously paired with the electronic device; and
        provide a signal based on a result of the checking,
        wherein only a defined number of security modules are allowed to be paired with the electronic device per slot or for each security module type at the electronic device the defined number being stored at the electronic device;
        wherein each security module is associated with a functionality;
        wherein the electronic device comprises a display; and
        wherein the electronic device is further configured to prevent the pairing based on incompatible functionalities rules.

11. A non-transitory computer readable medium for storing instructions which, when executed by a processor of an electronic device having at least one slot to receive a first security module, cause the electronic device to:
    pair the first security module with the electronic device;
    detect coupling of the security module with the electronic device;
    send a challenge to the security module;
    receive a response from the security module;
    check whether the response is valid at the electronic device, wherein a valid response indicates that the security module was previously paired with the electronic device; and
    provide a signal based on a result of the checking,
    wherein only a defined number of security modules are allowed to be paired with the electronic device per slot or for each security module type at the electronic device, the defined number being stored at the electronic device;
    wherein each security module is associated with a functionality;
    wherein the electronic device comprises a display; and
    wherein the electronic device further prevents the pairing based on incompatible functionalities rules.

* * * * *